United States Patent [19]

Rice et al.

[11] Patent Number: 4,818,801

[45] Date of Patent: * Apr. 4, 1989

[54] OPHTHALMIC DEVICE COMPRISING A POLYMER OF A TELECHELIC PERFLUOROPOLYETHER

[75] Inventors: David E. Rice, Oakdale; Jay V. Ihlenfeld, St. Paul, both of Minn.

[73] Assignee: Minnesota Mining and Manufacturing Company, St. Paul, Minn.

[*] Notice: The portion of the term of this patent subsequent to Apr. 3, 2001 has been disclaimed.

[21] Appl. No.: 447,605

[22] Filed: Dec. 13, 1982

Related U.S. Application Data

[63] Continuation-in-part of Ser. No. 340,473, Jan. 18, 1982, Pat. No. 4,440,918.

[51] Int. Cl.$^4$ ................................................ C09F 4/18
[52] U.S. Cl. .................................. 526/247; 351/160 R; 351/160 H; 523/106; 525/937; 526/246
[58] Field of Search ...................... 526/320, 246, 247; 523/106; 351/160 R, 160 H

[56] References Cited

U.S. PATENT DOCUMENTS

| | | | |
|---|---|---|---|
| 3,397,191 | 8/1968 | Beckerbauer | 526/247 |
| 3,505,229 | 4/1970 | Skehan | 252/54 |
| 3,660,360 | 5/1972 | Ray-Chaudhuri et al. | 526/246 |
| 3,699,145 | 10/1972 | Sianesi et al. | 260/463 |
| 3,766,251 | 10/1973 | Caporiccio et al. | 260/486 H |
| 3,810,741 | 5/1974 | Stalego | 65/2 |
| 3,810,874 | 5/1974 | Mitsch et al. | 260/75 H |
| 3,810,875 | 5/1974 | Rice et al. | 260/899 |
| 3,882,193 | 5/1975 | Rice et al. | 260/874 |
| 3,920,614 | 11/1975 | Kirimoto et al. | 526/246 |
| 4,080,319 | 3/1978 | Caporiccio et al. | 260/78 TF |
| 4,085,137 | 4/1978 | Mitsch et al. | 260/561 HL |
| 4,094,911 | 6/1978 | Mitsch et al. | 260/302 F |
| 4,109,070 | 8/1978 | Loshaek et al. | 526/320 |
| 4,143,017 | 3/1979 | Tarumi et al. | 526/320 |
| 4,321,404 | 3/1982 | Williams et al. | 560/115 |
| 4,440,918 | 4/1984 | Rice et al. | 526/246 |

*Primary Examiner*—Joseph L. Schofer
*Assistant Examiner*—J. Smith
*Attorney, Agent, or Firm*—Donald M. Sell; James V. Lilly

[57] ABSTRACT

Ophthalmic devices, such as contact lenses, of polymers of telechelic perfluorinated polyether monomers, and compositions for making such devices are disclosed. The devices possess improved oxygen permeability.

29 Claims, No Drawings

OPHTHALMIC DEVICE COMPRISING A POLYMER OF A TELECHELIC PERFLUOROPOLYETHER

CROSS REFERENCE TO RELATED APPLICATION

This is a continuation-in-part of application Ser. No. 340,473 filed Jan. 18, 1982 U.S. Pat. No. 4,440,918.

TECHNICAL FIELD

This invention is directed to ophthalmic devices, such as contact lenses, and polymers and compositions useful in such devices. More particularly it is directed to ophthalmic devices made from telechelic perfluoropolyether monomers, certain polymers made from telechelic perfluoroether monomers, and compositions containing telechelic perfluoropolyether monomers.

As it is used herein, the term "telechelic perfluoropolyether monomer" means a material containing perfluorooxyalkylene units in its backbone and having reactive groups, most commonly end groups, deliberately introduced onto the backbone.

BACKGROUND ART

The use of contact lenses for the correction of vision difficulties is known. However, such devices have not been accepted by many people, in part because of the time often required by the eye to become accustomed to their use, the physiological intolerance that sometimes develops often after only short periods of use, or the inadequate visual acuity which may be provided by them. Consequently, a great amount of effort has been expended in attempts to solve these problems for the contact lens wearer.

These efforts have included modification in both the design of the lens and the composition of the lens material. Modifications in lens design so as to improve the fit of the lens to the eye has produced only marginal reduction of the physiological intolerance. Modification of the composition of the lens material has also only been partially successful.

Early contact lenses were made from polymethyl methacrylate (PMMA), a hard material that is not water-absorptive. PMMA lenses frequently cause a great deal of physical discomfort to the wearer. Lenses of PMMA, although they are readily machinable and have excellent optical clarity and durability, have a high level of physiological intolerance for many individuals partly because of the stiffness of the lens and partly because the eye becomes deprived of oxygen due to the low oxygen permeability of the PMMA.

Lenses of soft water-absorptive hydrogel materials, such as poly(2-hydroxyethylmethacrylate) or poly(-vinylpyrrolidone), produce reduction of irritation but at the cost of reduced visual acuity and greatly increased maintenance of the lenses. When such hydrogel lenses contain a high water content they have a high oxygen permeability and are, therefore, comfortable to wear. The high water content hydrogel lenses, however, have poor durability and exhibit a tendency to become cloudy due to absorption of proteinaceous material.

Lenses of silicone rubber are easily molded, are said to possess a softness similar to that of the upper lid of the human eye and have a high permeability to oxygen. However, contact lenses of silicone rubber may cause a burning sensation in the eye because of the low thermal conductivity of silicone rubber. Also, such lenses have been reported to sometimes tighten over the cornea in a "suction cup" fashion that impedes movement of the lens. This permits entrapment of toxic products and debris under the lenses and prevents tears from washing away this debris and lubricating the eyes, thereby causing abrasion of the eye. Furthermore, silicone rubber, being lipophilic, mucophilic, and inherently non-wettable, attracts debris, e.g., proteins, lipids, mucoids, and the like.

It is an object of this invention to provide contact lenses which do not have the disadvantages of the polymethyl methacrylate, silicone rubber, and hydrogel contact lenses.

DISCLOSURE OF THE INVENTION

The present invention overcomes these and other disadvantages. It provides contact lenses, compositions, and polymers for making such lenses.

The contact lenses and the invention are mechanically strong yet flexible, are resistant to absorption of tear components, and are highly permeable to oxygen. Moreover, they possess these properties despite containing no more than an insignificant amount of water, e.g. less than 10% by weight. They comprise polymers of compositions containing up to 100 percent of telechelic perfluoropolyether monomer which has a backbone of perfluorooxyalkylene units, a number average molecular weight between about 500 and 15,000, and at least one group that can either be polymerized to form a polymer or reacted with a coreactant to form a polymer.

Preferably, the ophthalmic devices of the invention comprise optically clear copolymers of compositions containing said telechelic perfluoropolyether monomer and 2 to 50% by weight of copolymerizable comonomer.

Most preferably, ophthalmic devices of the invention have a wettable surface and comprise copolymers of the composition of the invention which comprises:
 (a) 50 to 88% by weight of said telechelic perfluoropolyether monomer having at least one group that can either be polymerized to form a polymer or reacted with a coreactant to form a polymer
 (b) 10 to 48% by weight of a first copolymerizable comonomer or first coreactant
 (c) 2 to 10% by weight of a second copolymerizable comonomer having a hydrophilic group.

The polymer of the invention comprises the product obtained by the polymerization of the foregoing compositions.

DETAILED DESCRIPTION

The ophthalmic devices of the present invention preferably exhibit an oxygen permeability of at least 10 Barrers when measured in accordance with the polarographic oxygen electrode method described by M. F. Refojo et al, "Permeability of Dissolved Oxygen Through Contact Lenses—1. Cellulose Acetate Butyrate", *Cont. Intraocular Lens Med. J.* 3(4), 27 (1977). More preferably the devices of the invention exhibit an oxygen permeability of at least 20 Barrers, and most preferably an oxygen permeability of at least 40 Barrers.

The devices of the invention preferably comprise polymers of a telechelic perfluoropolyether monomer that has a backbone having a number average molecular weight between about 500 and 15,000 or higher and has the formula

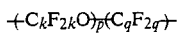 (Formula I)

wherein p represents the number of $-C_kF_{2k}O-$ repeating subunits in said backbone and is an integer of from 3 to 200; q is an integer of from 1 to 4; and k is the same within a given $-C_kF_{2k}O-$ subunits but may vary from subunit to subunit and is an integer of from 1 to 4. The $-C_kF_{2k}O-$ subunits, to the extent they differ from one another, are randomly distributed in the backbone.

Preferably the backbone is represented by the formula

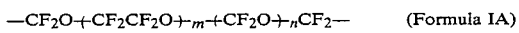 (Formula IA)

wherein m and n are numbers providing a number average molecular weight of 500 to 15,000 to the backbone and independently have a value of from 1 to 120. Additionally, the sum of m and n is from 7 to 120 and the ratio of m/n is from 0.2/1 to 5/1.

The preferred telechelic perfluoropolyether monomer has the formula

 (Formula II)

wherein Q is either a group that can be polymerized or a group that can be reacted with a coreactant to form a polymer;

W is a connecting group; and

Z is $-WQ$ or fluorine.

If Q is a polymerizable group, it is preferred that the monomer have a polymerizable group functionality in the range 1.5 to 2. If Q is a reactive group, it is preferred that the monomer have a reactive group functionality of 2.

The monomers of Formula I, together with polymers prepared therefrom are disclosed in U.S. Pat. Nos. 3,505,229; 3,699,145; 3,766,251; 3,810,874; 3,810,875; 3,814,741; 3,882,193; and 4,321,404 which patents are incorporated herein by reference. These materials are characterized by possessing perfluorooxyalkylene units in their backbone.

Included among reactive Q groups useful in Formula II include

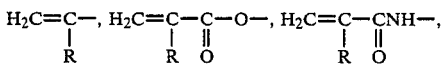

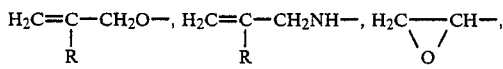

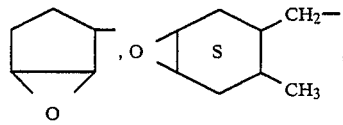

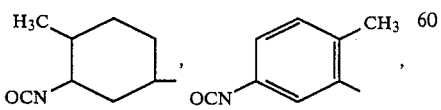

$-NCO$, $-COOH$, $-OH$, $-NR_2$, $-SR$, $-SiR_gR'$, $-CN$, $-OSO_2CF_3$, $-OCOCl$, $-OCN$, $-N(R)CN$, $-I$, $-CHO$, $-CH(OR_2)$, $-SO_2Cl$, $-C(OR=NH$, $-C(NH_2)=NH$ and the like wherein R is selected from hydrogen, lower alkyl (i.e., $C_1-C_4$) and aryl; $R^1$ is selected from halogen, $-OR$, and

and $-CH=CH_2$, and "g" is 0, 1, 2, or 3.

W is a divalent linking moiety which may be a covalent bond. Exaples of other useful W moieties include

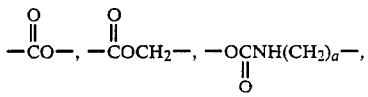

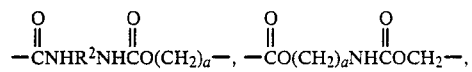

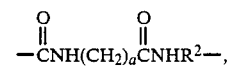

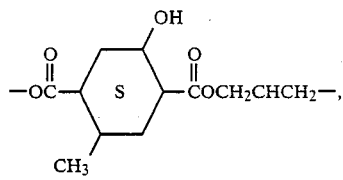

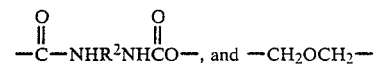

wherein "a" is an integer of from 1 to 12, $R^2$ is selected from a divalent aliphatic group having from 2 to 14 carbon atoms, a divalent 5- or 6-membered cyclic group having from 5 to 14 carbon atoms, and an arylene group having from 6 to 14 carbon atoms. In the interest of brevity, further description of the preferred monomers will be omitted as a more complete discussion of the reactive groups, the coreacting groups and the preparation of the monomers is given in the references incorporated by reference.

Other examples of useful W moieties include

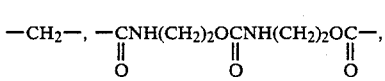

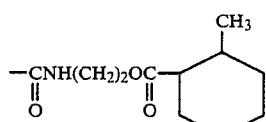

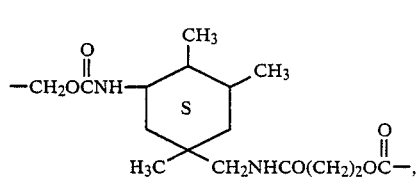

-continued

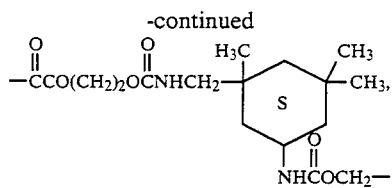

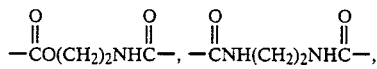

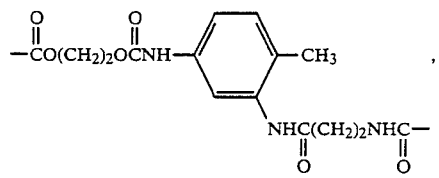

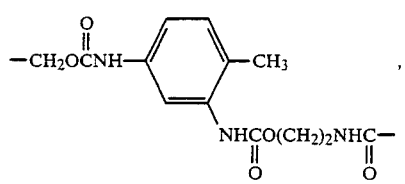

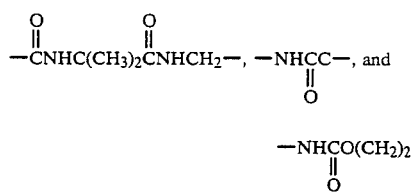

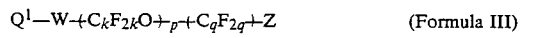

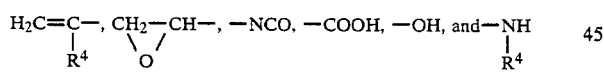

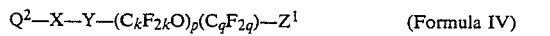

A more preferred telechelic perfluoropolyether monomer has the formula $$Q^1-W-(C_kF_{2k}O)_p-(C_qF_{2q})-Z \quad \text{(Formula III)}$$

wherein $Q^1$ is a reactive group selected from the group consisting of

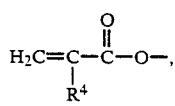

wherein $R^4$ is hydrogen or methyl, and Z, W, k, q, and p are the same as defined above.

A preferred subclass of Formula III monomers employs ethylenically unsaturated Q groups and may be represented by the formula $$Q^2-X-Y-(C_kF_{2k}O)_p(C_qF_{2q})-Z^1 \quad \text{(Formula IV)}$$

wherein $Q^2$ is selected from

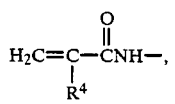 (A)

(B)

-continued

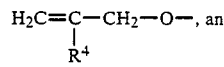 (C)

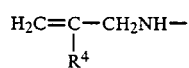 (D)

X is selected from a covalent bond (E)

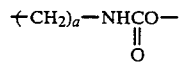 (F)

 (G)

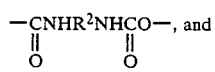 (H)

 (I)

Y is selected from

 (J)

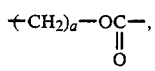 (K)

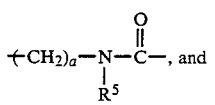 (L)

 (M)

wherein $R^5$ is a lower alkyl group having 1 to 4 carbon atoms, $R^4$ and "a" are as defined above, and "b" is an integer of from 1 to 12; provided that when (1) Q is (A) or (B), then X is selected from (E), (F), or (G) and Y is selected from (J), (K), or (L);
(2) Q is (C) then either
  (i) X is (E) and Y is (M), or
  (ii) X is selected from (E), (F), (G), (H), or (I) and Y is selected from (J), (K), or (L); and
(3) Q is (D) then either
  (i) X is (E) and Y is (M), or
  (ii) X is selected from (H) and (I) and Y is selected from (J), (K), or (L); and $Z^1$ is selected from $-OC_kF_{2k+1}$, and $Q^2-X-Y-$ wherein $Q^2$, X, Y and k are as defined above.

Within the foregoing description, the following represents a particularly preferred subclass of Formula IV monomers:

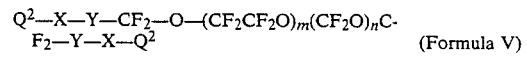 (Formula V)

wherein m and n are as defined in Formula IA.

Specific examples of telechelic perfluoropolyethers of Formula V are

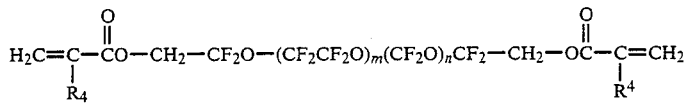
VI
and
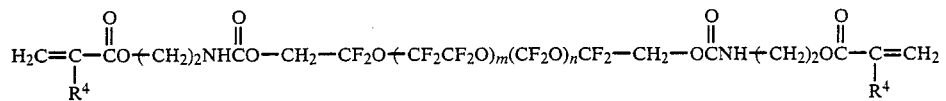
VII
A number of other telechelic perfluoropolyethers of Formula IV are useful in preparing the devices of the invention. Specific examples of these materials include
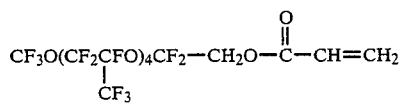
VIII
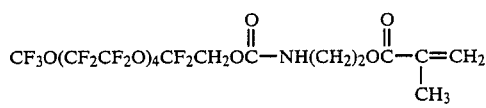
IX
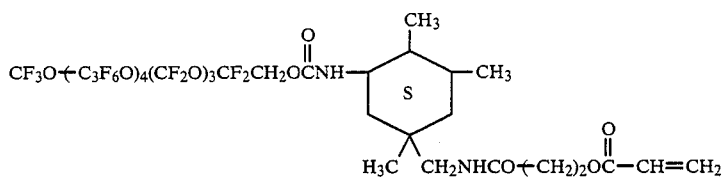
X
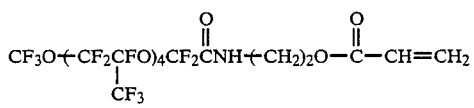
XI
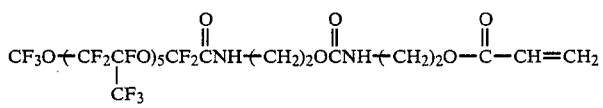
XII
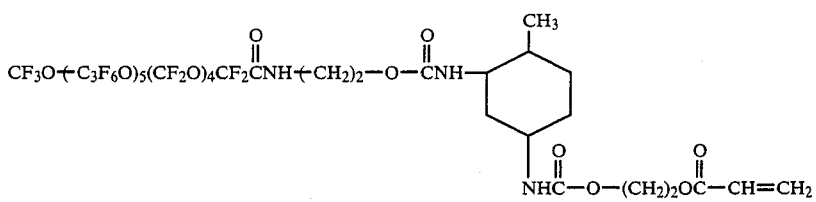
XIII
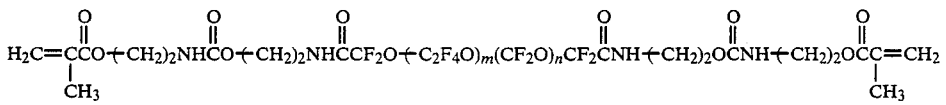
XIV
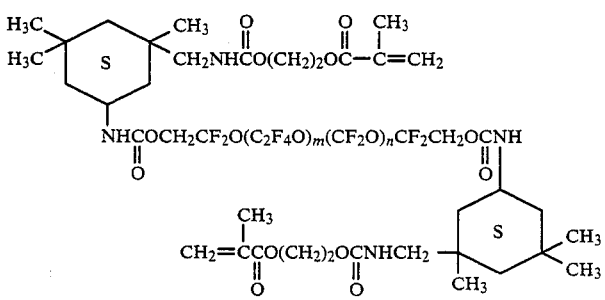
XV -continued
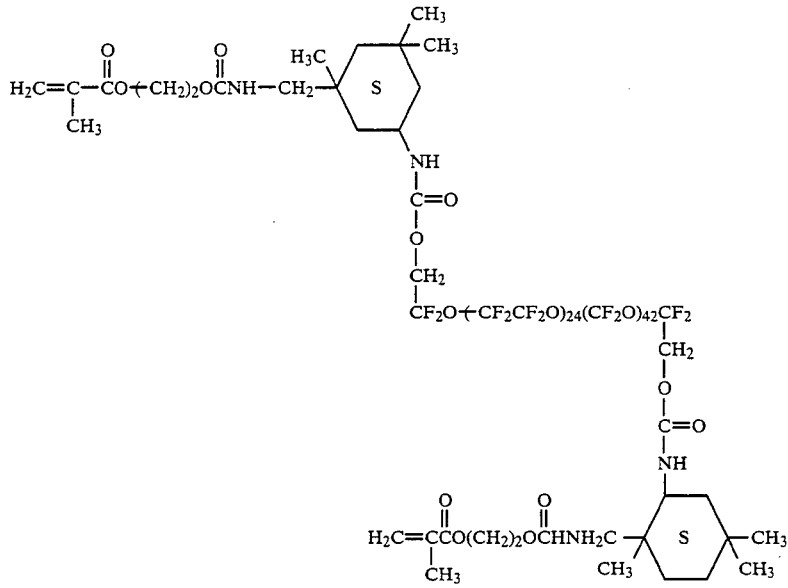
XVI
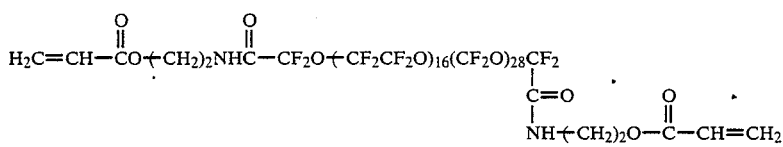
XVII
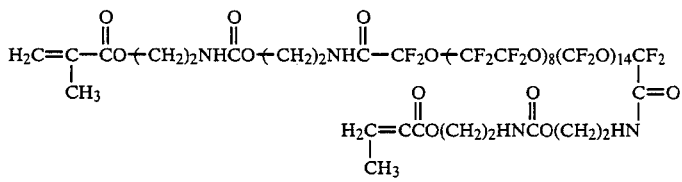
XVIII
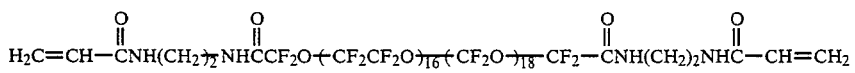
XIX
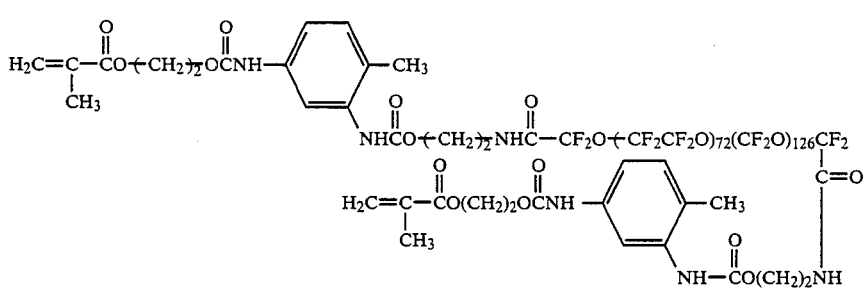
XX
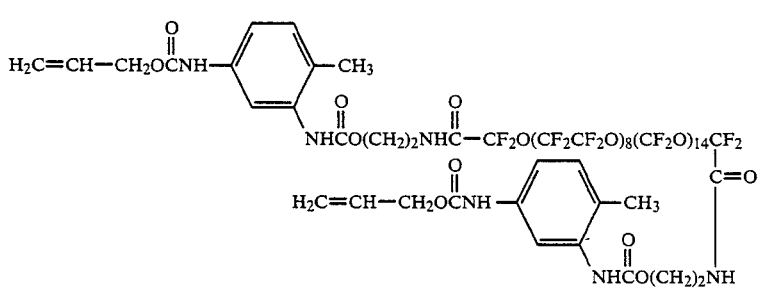
XXI

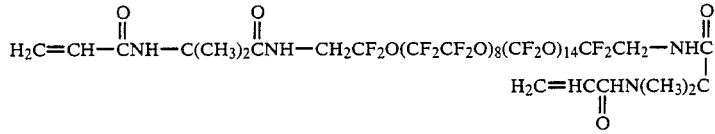

XXII

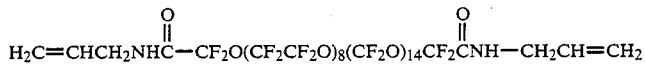

XXIII

In addition to the ethylenically unsaturated telechelic perfluoropolyether monomers, other monomers of Formula III are useful in the present invention. Specific examples of these monomers include

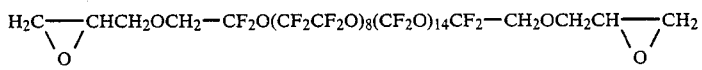

XXIV

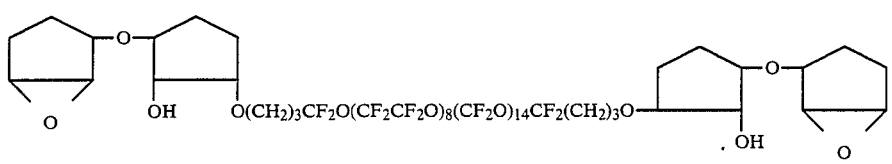

XXV

XXVI

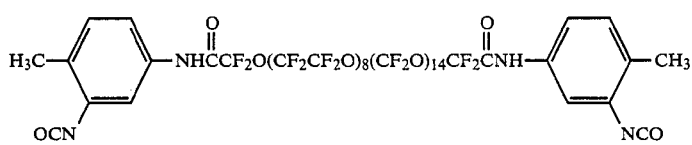

XXVII

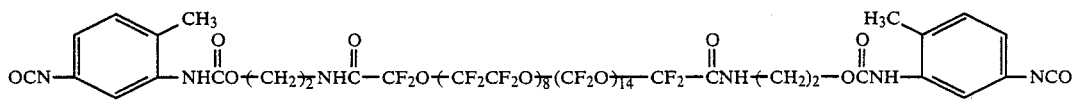

XXVIII

Still other examples of useful telechelic perfluoropolyether monomers of Formula III include reaction product of a monomer containing epoxide functionality (e.g., compounds XXIV through XXVI) or an isocyanate functionality (e.g., compounds XXVII and XXVIII) with tion are preferably combined, prior to polymerization, with a compatible, copolymerizable comonomer. The amount of comonomer employed preferably comprises at least 2 weight percent, and more preferably from about 2 to 50 weight percent, of the combined weight of the telechelic perfluoropolyether monomer and the comonomer. Most preferably the comonomer comprises from about 10 to 40 weight percent of the combined weight of the telechelic perfluoropolyether monomer and the comonomer.

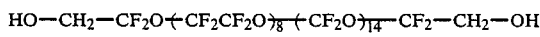

XXIX

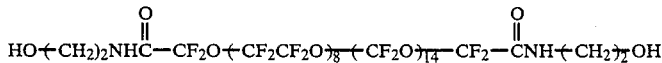

XXX

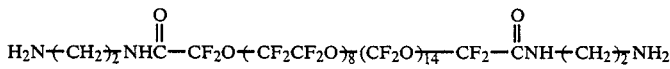

XXXI

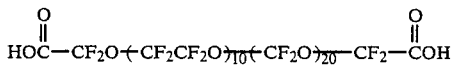

XXXII

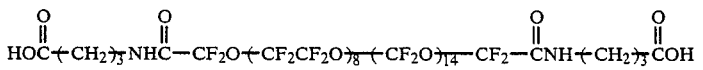

XXXIII

The ethylenically unsaturated telechelic perfluoropolyether monomers (i.e., those of Formulae IV and V) utilized to make the devices of the present inven- A variety of such comonomers are useful for this copolymerization and are characterized by having polymerizable ethylenically-unsaturated groups. Representative examples include methyl and ethyl acrylate, methyl and ethyl methacrylate, cyclohexyl methacrylate, methyl 2-chloroacrylate, 2-ethoxyethyl methacrylate, 2,2,2-trifluoroethyl acrylate and methacrylate, 2-cyanoethyl methacrylate, 2-(N-methylcarbamoyloxy)ethyl acrylate and methacrylate, acrylic acid, methacrylic acid, vinylidene chloride, vinylidene fluoride, methacryloyloxypropyltris(trimethylsilyl)siloxane, and methacryloyloxymethylpentamethyldisiloxane, and mixtures of two or more of these materials. Particularly preferred comonomers include methyl methacrylate, ethyl methacrylate, and cyclohexyl methacrylate.

A variety of other ingredients may be included in the polymerization mixture so as to either enhance or provide specific properties. For example, the dimensional stability of the devices of the invention may be enhanced by including from about 0.5 to 25 parts by weight of a polyfunctional monomer per 100 parts by weight of polymerization mixture. Representative examples of useful polyfunctional monomers include ethyleneglycol diacrylate, ethyleneglycol dimethacrylate, diethyleneglycol dimethacrylate, allyl methacrylate, trimethylolpropane trimethacrylate, divinyl benzene, diallyl phthalate, and the polyacrylate and polymethacrylate esters of isocyanuric acids and s-triazines (e.g., tris(2-acryloyloxyethyl)isocyanurate [available as "SR ®-368" from Sartomer Co., West Chester, PA]) and 1,3,5-tri(2-methacryloxyethyl)isocyanurate.

Wettability is a very important characteristic for contact lenses to possess in order to provide comfort and good visual acuity. Wettability can be improved (i.e., water contact angle brought to below about 70°) in a number of ways. For example, the monomers of Formulae IV or V can be polymerized with from about 2 to 10 parts by weight of the total weight of the polymerization mixture of a copolymerizable ethylenically-unsaturated monomer that has a hydrophilic group such as, for example, a hydroxy, carboxy, carbonamido sulfonyl, and sulfonamido groups. Representative examples of useful water-soluble, ethylenically-unsaturated monomers include 2-hydroxyethyl acrylate and methacrylate, 3-hydroxypropyl acrylate, 4-hydroxybutyl acrylate, 5-hydroxypentyl acrylate, 2,3-dihydroxypropyl acrylate and methacrylate, N-vinyl-2-pyrrolidone, 2-carboxyethyl acrylate, 2-carbonamidoethyl methacrylate, 2-sulfoethyl methacrylate, 2-sulfoamidoethyl acrylate, vinylsulfonic acid, and mixtures thereof.

Another technique for improving the wettability of the devices of the invention involves subjecting the surface of the device to the action of a glow discharge at a low pressure (e.g., 0.01 to 5 Torr) for from about 0.5 to 10 minutes in accordance with the disclosure in U.S. Pat. No. 3,940,207. This technique may be used to improve the wetability of devices of the invention prepared from any of the telechelic monomers.

Particularly preferred compositions according to the invention comprise (a) from 50 to 88 (preferably 67 to 83) weight percent of the Formulae IV or V monomer (b) from 10–48 (preferably 15 to 28) weight percent of the ethylenically unsaturated monomer copolymerizable with said Formulae IV or V monomer and (c) from 2 to 10 (preferably 2 to 8) weight percent of an ethylenically unsaturated monomer having hydrophilic groups copolymerizable with the Formulae IV or V monomer.

The Formulae IV or V monomers may be prepared by the reaction of a poly(perfluorooxyalkylene)alkanol or -diol or a poly(perfluorooxyalkylene)amidoalkanol or -diamidoalkanol or the corresponding amino or diamino compounds with the halide, anhydride, or lower alkyl ester of acrylic or methacrylic acid, or with an isocyanatoalkyl acrylate or methacrylate, or with the reaction product of one mole of an organic diisocyanate and one mole of a hydroxyalkyl acrylate or methacrylate. They may also be prepared by the reaction of a poly(perfluorooxyalkylene)carbonyl halide or dicarbonyl halide with an alkyleneamine, such as allylamine.

Polymerization of the Formulae IV and V monomers may be carried out by employing initiators which generate free-radicals on application of an activating energy as is conventionally used in the polymerization of ethylenically unsaturated monomers. Included among free-radical initiators are the conventional thermally activated initiators such as organic peroxides and organic hydroperoxides. Representative examples of such initiators include benzoyl peroxide, tertiary-butyl perbenzoate, diisopropyl peroxydicarbonate, cumene hydroperoxide, azobis(isobutyronitrile), and the like. Generally, from about 0.1 to 5 percent by weight of thermal initiator is used.

Photoinitiators may also be employed to initiate polymerization. Such initiators are well known and have been described, for example, in polymerization art, e.g., Chapter II of "Photochemistry" by Calvert and Pitts, John Wiley & Sons (1966). The preferred initiators are photoinitiators which facilitate polymerization when the composition is irradiated. Representative examples of such initiators include acyloin and derivatives thereof, such as benzoin, benzoin methyl ether, benzoin ethyl ether, benzoin isopropyl ether, benzoin isobutyl ether and α-methylbenzoin; diketones such as benzil and diacetyl, etc.; ketones such as acetophenone, $\alpha,\alpha,\alpha$-trichloroacetophenone, $\alpha,\alpha,\alpha$-tribromoacetophenone, $\alpha,\alpha$-diethoxyacetophenone (DEAP), 2-hydroxy-2-methyl-1-phenyl-1-propanone, o-nitro-$\alpha,\alpha,\alpha$-tribromoacetophenone, benzophenone and p,p'-tetramethyldiaminobenzophenone; α-acyloxime esters such as benzil-(O-ethoxycarbonyl)-α-monoxime; ketone/amine combinations such as benzophenone/N-methyldiethanolamine, benzophenone/tributylamine and benzophenone/Michler's ketone; and benzilketals such as bezildimethylketal, benzildiethylketal and 2,5-dichlorobenzildimethylketal. Normally, the photoinitiator is used in amounts ranging from about 0.01 to 5% by weight of the total oligomeric composition. When the quantity is less than 0.01% by weight, the photopolymerization rate becomes extremely low. If the photoinitiator is used in excess of 5% by weight, no correspondingly improved effect is observed. Preferably, about 0.25 to 1.0% of photoinitiator is used in the polymerizable compositions.

Polymerization may be carried out in bulk in a conventional manner. When the activating energy is ultraviolet light, the irradiation is typically carried out at a temperature of about 0° to 50° C. for 0.5 minute to 5 hours or more. Following ultraviolet irradiation, the composition may be heated at 50° to 100° C. to complete the polymerization.

When the activating energy is only heat, polymerization is usually carried out at a temperature from about 40° to 140° C. for about 5 to 50 hours. The polymerization can also be carried out in stages. Thus, in a first stage, the composition may be heated at 40° to 60° C. for about 5 to 25 hours, and in a second stage it may be heated at 50° to 100° C. for 5 to 25 hours. It is to be understood, of course, that the polymerization conditions are not limited to such temperature and time conditions nor to the use of ultraviolet or heat as the initiating energy.

Telechelic polyperfluoropolyether monomers other than those of Formulae IV and V may also be polymerized by techniques that are known.

For example, where the reactive group $Q^1$ of a Formula III monomer is an epoxide group (e.g., Compounds XXIV through XXVI) polymerization may be effected either thermally or by activating radiation. Suitable thermal polymerization catalysts or initiators include acid curing agents such as Bronstead and Lewis acids, for example aluminum chloride, zinc chloride, antimony pentafluoride, bis(trifluoromethanesulfonyl)methane, etc.; Lewis acid adducts such as boron trifluoride diethyl etherate, boron trifluoroide-amine adducts, antimony pentachloride-aniline adduct, alkylcarboxytin compounds such as dibutyltindiacetate, etc.; inorganic acids such as phosphoric acid; and Lewis bases such as diethanolamine, benzyldimethylamine and triethylamine. Generally from 1 to 5 percent by weight of catalyst is used. Many of the catalysts give exothermic reactions and cure completely within a few hours without externally applied heat. Many other of the catalysts, particularly the amine adducts, give compositions which are storage stable for months but then can be polymerized by application of heat for several minutes to several hours at temperatures up to 250°. Discussion of the polymerization of epoxy compounds can be found in Lee and Neville, "Handbook of Epoxy Resins," McGraw-Hill Book Co., New York (1967).

When activating radiation is employed to effect polymerization of monomers in which the $Q^1$ group is epoxy groups, it is advantageous to use a photoinitiator which releases Lewis acid on exposure to radiation. Suitable photoinitiators are the arylonium salts of halogen-containing complex anions including for example the aryldiazonium salts such as described in U.S. Pat. No. 3,835,003, the arylhalonium salts desdribed in U.S. Pat. No. 4,026,705 and the aromatic onium salts of Group VIa elements such as the aromatic sulfonium salts such as are described in U.S. Pat. Nos. 4,058,400 and 4,058,401. Examples of suitable arylonium salts include: p-chlorobenzenediazonium tetrafluoroborate, o-nitrobenzenediazonium hexafluoroantimonate, 2,5-diethoxy-4-(p-tolythio)benzenediazonium hexachlorophosphate, 4,4'-dimethyldiphenyliodonium hexafluoroarsenate, 4,4'-di-t-butyldiphenyliodonium hexafluoroantimonate, diphenyliodonium hexafluoroantimonate, 4,4'-biphenyliodonium tetrafluoroborate, triphenylsulfonium hexafluorophosphate, phenacyltetramethylenesulfonium tetrafluoroborate, triphenylselenonium hexachlorophosphate, triphenylsulfonium hexafluoroantimonate, 4-phenylthiophenyldiphenylsulfonium hexafluoroantimonate.

Monomers which are copolymerizable with the telechelic perfluoropolyether monomers of Formula III in which $Q^1$ is an epoxy group include monomeric epoxy compounds and epoxides of the polymeric type and can be aliphatic, cycloaliphatic, aromatic or heterocyclic. These materials generally have at least one polymerizable epoxy group per molecule but can have a plurality of epoxy groups. A large number of suitable copolymerizable low and high molecular weight mono and polyepoxy group-containing compounds are listed in columns 3 and 4 of U.S. Pat. No. 4,219,377 among many other patents.

Where the reactive group, $Q^1$, of the Formula III monomer is an isocyanate group (e.g., Compounds XXVII and XXVIII) a polymer is prepared by trimerization of the isocyanate group to produce a polyisocyanurate in the presence of a trimerization catalyst. Many trimerization catalysts for the reaction are known, e.g., see "Polyurethanes: Chemistry and Technology," Part 1, by J. H. Saunders and K. C. Frisch, Interscience Pub., New York (1962). Preferred catalysts are the trithiocarbonates disclosed in U.S. Pat. No. 3,715,337 (Allen et al.).

Isocyanates that can be cotrimerized with the telechelic perfluoropolyether monomers of Formula III in which $Q^1$ is an isocyanate group include the aliphatic, aromatic and heterocyclic isocyanates known in urethane chemistry. Examples include mono and polyisocyanates such as phenylisocyanate, tolylenediisocyanate and 1,3,5-benzenetriisocyanate. Preferred isocyanates are the diisocyanates.

Examples of preferred diisocyanates include 2,4-tolylene diisocyanates, 3,5,5-trimethyl-1-isocyanato-3-isocyanato-methylcyclohexane (also called isophorone diisocyanate and sold under the trademark "IPDI" by Veba-Chemie AG), methylene bis-(4-cyclohexylisocyanate) sold under the trademark "Hylene" WS by duPont, hexamethylene diisocyanate and 1,3-di(isocyanatoethyl)hydantoin. Other suitable diisocyanates are described in U.S. Pat. Nos. 3,641,199; 3,700,643; and 3,931,117, among many others. It is to be understood that the amount of isocyanate used must provide no more than 50 percent of the combined weight of isocyanate-terminated telechelic perfluoropolyether monomer and the isocyanate.

Where $Q^1$ and Z of Formula III are both reactive groups, polymers from which the devices of the invention can be prepared can be made by reaction with a coreactant having two or more groups complimentary (i.e., reactive with) to the reactive group, $Q^1$. When $Q^1$ and Z are isocyanato groups, —NCO, polymers that can be used to make the devices of the invention can be prepared by reaction with polynucleophilic compounds such as polyols, polyamines, polythiols, and polycarboxylic acids having a hydroxyl, amino, thiol, and carboxyl equivalent weight up to about 2500, preferably about 200 to 1250. The polymers formed, respectively are polyurethanes, polyureas, polythioureas, and polyamides.

Representative examples of low molecular polynucleophilic compounds that may be used include water, alkylene glycols (e.g., 1,1-ethanediol, 1,3-propanediol, 1,4-butanediol, 2-ethyl-1,6-hexanediol, bis(hydroxymethyl) cyclohexane, 1,18-dihydroxyoctadecane, 3-chloro-1,2-propanediol), polyhydroxyalkanes (e.g., glycerine, trimethylolethane, pentaerythritol, sorbitol) and other polyhydroxy compounds such as N,N-bis(hydroxyethyl) benzamide, 2-butyne-1,4-diol, 4,4'-bis(hydroxymethyl)diphenylsulfone, castor oil, the perfluoropolyetherdiols such as Compounds XXIX and XXX, etc. and corresponding amino and thiol compounds. Examples of polycarboxylic acids that may be used include succinic, adipic, sebacic, o-, m-, and p-phthalic acid and the like.

Representative examples of useful higher molecular weight polynucleophilic compounds have equivalent weight up to 2500 corresponding to molecular weights of 5000 for diols and 7500 for triols, preferably 400 to 2500 for diols and 500 to 3750 for triols and include polyalkylene glycols and triols such as polyethylene glycols and triols and polypropylene glycols and triols, polytetramethylene glycols of varying molecular weight; copolymers of hydroxypropyl and hydroxethyl acrylates and methacrylates with other free radical-polymerizable monomers such as acrylate esters, vinyl halides or styrene; copolymers containing pendent hydroxy groups formed by hydrolysis or partial hydrolysis of vinyl acetate copolymers, polyvinylacetal resins containing pendent hydroxyl groups; modified cellulose polymers such as hydroxyethylated and hydroxypropylated cellulose; hydroxy-terminated polyesters and hydroxy-terminated polyacetones; hydroxy-terminated polyalkadienes; and corresponding amino and thiol compounds.

From about 0.9 to 1.1 equivalent weights of polyhydroxy compound is used per isocyanate equivalent weight. Although it is not necessary, it is often advantageous to add about 0.01 to 1.0 percent by weight of the combined weight of the polynucleophilic compound and isocyanatoperfluoropolyether of a catalyst for the reaction as is known in the art may be used.

When $Q^1$ and Z of Formula III are both epoxy groups, polymers can be made by reaction with coreactants, i.e., epoxy curing agents such as are known in the art (see, for example, Lee and Neville, "Handbook of Epoxy Resins," McGraw-Hill Book Co., New York (1967)). Examples of curing agents include primary and secondary polyamines such as hexamethylenediamine, methanediamine, m-xylenediamine, diethylenetriamine, piperazine, and melamine; carboxylic acids and anhydrides such as o-phthalic acid and anhydride, succinic acid and anhydride, nadic anhydride and polysebacic polyanhydride; polyols such as ethylene glycol, butylene glycol, diethanolamine, glycerine, and tetraoxyethylene glycol. The reaction is generally carried out by heating a mixture of equivalent weights of the perfluoropolyetherdiepoxide and the curing agent at a temperature of 50° to 200° C. for 0.5 to 5 hours until the disappearance of the epoxy group. It is usually desirable to accelerate the reaction by use of a catalyst such as a Lewis acid or a tertiary amine as is known in the art.

When $Q^1$ and Z of Formula III are hydroxyl groups such as exemplified in Compounds XXIX and XXX or amino groups such as the exemplified Compound XXVI, polymers can be made by reaction with a coreactant having 2 or more functional groups reactive with the hydroxyl or amino group to form covalent bonds as is known in the art. Included among such coreactants are polyisocyanates, polycarboxylic acids (including their anhydrides, acid halides, and esters with volatile alcohols), hexamethoxymethylmelamine, formed by reaction with a low molecular weight alkanol such as is exemplified by Compound XXXIII, polymers can be prepared by reaction with polyisocyanates, polyols, polyamines to form polyurethanes, polyesters, and polyamides as is known in the art.

The devices of the invention may be prepared by charging the material to be polymerized to a mold of the desired configuration and causing polymerization to take place therein. Devices having the desired final configuration may be obtained in this manner. The resultant device may be machined and/or polished if desired using techniques known to the art.

Alternatively, the devices of the invention may be provided by polymerizing the telechelic perfluoropolyether monomer into a rod, block, or sheet followed by cutting the device therefrom. This technique is useful when the polymerization product contains at least about 30 weight percent of the compatible comonomer copolymerizable with the perfluoropolyether monomer. Where the functionalities of the monomers allow, a thermoplastic polymer is obtained from which the devices can be molded by injection molding or other molding procedures.

The present invention is further described in the following representative examples. All temperatures are given in degrees Centigrade and all parts are given in parts by weight unless otherwise stated.

EXAMPLE 1

A hydroxyl-terminated telechelic perfluoropolyether monomer having the formula

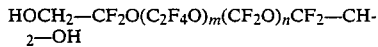

$$HOCH_2-CF_2O(C_2F_4O)_m(CF_2O)_nCF_2-CH_2-OH$$

and a hydroxyl equivalent weight of about 1050 was prepared according to the procedures described in U.S. Pat. No. 3,810,874, Example VIII. A 250 ml bottle was charged with 222 g of this hydroxyl-terminated material, 32.0 g 2-isocyanatoethyl methacrylate, and 0.14 g dibutyltin dilaurate. The bottle was capped and shaken on a mechanical shaker for 20 hours, a mild exotherm being noted during the first hour. After shaking, an infrared spectrum taken of the cloudy reaction product indicated disappearance of isocyanate. The mixture was dissolved in 400 ml 1,1,2-trichloro-2,2,1-trifluoroethane (Freon-113) and washed successively with three portions of 100 ml water each. The Freon was stripped from the washed material, the residue shaken in a separatory funnel with 500 ml of FC-75 (a perfluorinated cyclic ether available from 3M Company) and the lower layer periodically withdrawn over a period of two days until no further separation occurred. Removal of solvent from the upper layer yielded 214 g of clear oil ($n_D^{22}$ 1.3337), identified by NMR as essentially pure telechelic perfluoropolyether monomer having the formula

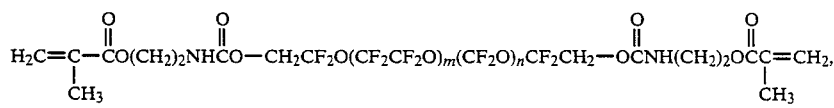

and the perfluoropolyether dicarboxylic acids such as Compounds XXXII and XXXIII.

When $Q^1$ and Z of Formula III are both carboxyl or amino groups, their halide derivative, or the ester wherein m/n is about 0.6 and m is about 8.0. Removal of solvent from the lower layer yielded 37 g of cloudy oil ($n_D^{22}$ 1.3230) identified by NMR as

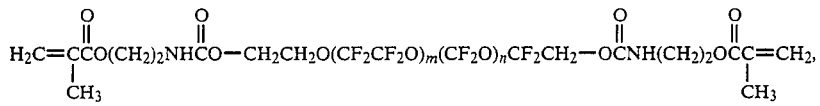

unreacted HOCH$_2$—CF$_2$O(C$_2$F$_4$O)$_m$(CF$_2$O)$_n$CF$_2$—CH$_2$OH, and nonfunctional material having a perfluorooxyalkylene backbone.

EXAMPLE 2

A 25 cc round bottom flask, fitted with a magnetic stirrer and stopcock, was charged with 9.8 g of the telechelic perfluoropolyether dimethacrylate monomer of Example 1, 0.2 g of methyl methacrylate and 0.05 g α,α-diethoxyacetophenone. The mixture was stirred to effect solution and then frozen by immersing the flask in liquid nitrogen. The flask was evacuated for five minutes at a pressure of 1 Torr. The stopcock was then closed and the flask allowed to warm to room temperature. This freeze/thaw procedure was performed a total of three times in order to eliminate dissolved oxygen from the telechelic perfluoropolyether monomer. The flask was then transferred to a nitrogen filled glove bag and a portion of the contents were charged into an ultraviolet transmissive contact lens mold by means of a syringe. After loading the lens mold, it was removed from the glove bag, suspended in a vertical position and subjected to radiation from a RS sunlamp positioned 18 cm away. After five minutes the lens mold was rotated 180° and irradiation continued for an additional 55 minutes. The mold was opened and the polymeric lens removed. It was flexible, transparent, had a refractive index of $n_D^{23}$ 1.355 and an oxygen permeability of 115 Barrers, measured as disclosed previously.

EXAMPLE 3

Example 2 was repeated using 10 g of the telechelic perfluoropolyether monomer and none of the methyl methacrylate. The contact lens obtained was flexible, transparent, and had $n_D^{23}$ 1.344 and an oxygen permeability of 125 Barrers.

EXAMPLE 4

A hydroxy-terminated telechelic perfluoropolyether monomer having the same formula as given in Example 1 and having a hydroxyl equivalent weight of 400 was prepared according to the procedures described in U.S. Pat. No. 3,810,874, Example VIII. This material was used to prepare a telechelic perfluoropolyether monomer having the formula

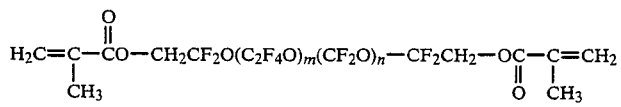

in which the ratio of m to n was 0.6 wherein m was about 3 and n was about 5. The monomer was prepared by reaction of the hydroxy-terminated perfluoropolyether with methacryl chloride in accordance with the procedures described in Example XV of U.S. Pat. No. 3,810,874.

A contact lens prepared from the monomer of Example 3 in accordance with the procedure of Example 2 was transparent, somewhat stiff, had an $n_D^{22}$ of 1.360, and had an oxygen permeability of 47 Barrers.

EXAMPLE 5

A series of mixtures of the telechelic perfluoropolyether monomer of Example 1 and methyl methacrylate (MMA) were prepared to contain 0.5% by weight of α,α-diethoxyacetophenone and deoxygenated as described in Example 2. The deoxygenated mixtures were transferred within a nitrogen filled glove bag by means of a syringe into individual sheet molds. The sheet molds consisted of two glass plates (each 15 cm × 15 cm), covered on the inside by 100 micrometer thick poly(ethyleneglycolterephthalate) film, which was provided as a release surface. The plates were spaced apart by means of two layers of black vinyl electrical tape (total thickness, 375 μm) which had small channels on one side to permit loading through a syringe and to allow the escape of bubbles. After loading the molds, they were clamped together, suspended in a vertical position and subjected to radiation from a RS sunlamp positioned 18 cm away. After five minutes, the mold was rotated 180° and irradiation continued for an additional 55 minutes. The transparent molded polymers obtained were found to have the following properties:

| Wt. Ratio of Fluorinated Polymer to MMA | $n_D^{25a}$ | Tensile Strength[b] kg/cm$^2$ | Modulus[b] kg/cm$^2$ | Percent Elongation[b] | O$_2$ Permeability[c] (Barrers) |
|---|---|---|---|---|---|
| 80/20 | 1.38 | 169 | 2,960 | 45 | 60 |
| 70/30 | 1.40 | 201 | 5,780 | 55 | 30 |
| 50/50 | 1.43 | 254 | 9,860 | 45 | 10 |

[a] Measured according to ASTM D-542
[b] Measured according to ASTM D-882
[c] Measured according to Refojo et al, supra

EXAMPLE 6

A mixture of 7.0 g of the telechelic perfluoropolyether monomer of Example 1, 3.0 g methyl methacrylate, and 0.02 g diisopropyl peroxydicarbonate were mixed and deoxygenated according to the procedure of Example 2. The mixture was transferred, in a nitrogen filled glove bag, into a glass vial (14 mm inside diameter × 50 mm long). The vial was capped and heated in an oven at 30° C. for 24 hours followed by heating at 50° C. for an additional 24 hours. The resulting clear polymer plug was found to have a Shore D hardness of 50 and was machined by conventional means into contact lenses.

EXAMPLE 7

Example 6 was repeated using a mixture of 5.0 g of the telechelic perfluoropolyether monomer of Example 1, 5.0 g methyl methacrylate and 0.02 g diisopropyl peroxydicarbonate. The clear plug obtained was easily machined by conventional means into contact lenses.

EXAMPLE 8

The wettability of the molded polymers of Example 5, prepared from mixtures of the telechelic perfluoropolyether monomer of Example 1 and methylmethacrylate (MMA), was improved by subjecting the molded surfaces to 60 Hz AC glow discharge plasma in helium at low pressure (400 mTorr). Sessile drop water contact angles were measured (using a NRL contact angle goniometer, model A-100 from Rame-Hart, Inc.) before and after surface treatment:

| Wt. ratio of fluorinated polymer to MMA | Water contact angle before surface treatment | Water contact angle after surface treatment |
| --- | --- | --- |
| 80/20 | 87.5° | 69° |
| 70/30 | 78° | 56° |
| 50/50 | 83° | 49° |

These data indicate the utility of glow discharge treatment for improving surface wettability of devices containing the telechelic perfluoropolyether polymer.

EXAMPLE 9

A mixture of 7.0 g of the telechelic perfluoropolyether monomer of Example 1, 3.0 g methyl methacrylate, 0.8 g hydroxyethyl methacrylate, and 0.06 g α,α-diethoxyacetophenone was polymerized according to the procedure of Example 5. The improved wettability of this polymer was demonstrated by measuring the water contact angle after soaking the polymer in water for a period of five days. A value of 45° was obtained. A similar polymer, not containing hydroxyethyl methacrylate was found to have a value of 78°.

EXAMPLE 10

A polymer was prepared from a mixture of 5.0 g of the telechelic perfluoropolyether monomer of Example 1,

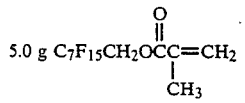

and 0.05 g α,α-diethoxyacetophenone according to the procedure of Example 5. The resulting transparent polymer was found to have an oxygen permeability of 53 Barrers and an $n_D{}^{23}$ of 1.356 and was suitable for use as a contact lens.

EXAMPLE 11

A mixture of 7.0 g of the telechelic perfluoropolyether monomer of Example 1, 2.0 g N-vinylpyrrolidone, 1.0 g methyl methacrylate and 0.05 g α,α-diethoxyacetophenone was polymerized according to the method of Example 5. The resulting optically clear, flexible polymer was found to have the following properties: tensile strength—105 kg/cm$^2$, modulus—1060 kg/cm$^2$, elongation—41%, $n_D{}^{25}$—1.403, H$_2$O contact angle—24° and oxygen permeability of 36 Barrers.

EXAMPLE 12

A lens was prepared according to the procedure of Example 2 from a mixture of 8.0 g of the telechelic perfluoropolyether monomer of Example 1, 2.0 g vinylidene chloride and 0.05 g α,α-diethoxyacetophenone according to the method of Example 2. The contact lens obtained was flexible and transparent and had an oxygen permeability of 140 Barrers and an $n_D{}^{23}$ of 1.385.

EXAMPLE 13

A mixture of 8.0 g of the telechelic perfluoropolyether monomer of Example 1, 2.0 g methacrylic acid and 0.05 g α,α-diethoxyacetophenone was polymerized by the procedure described in Example 5. The transparent polymer obtained had a tensile strength of 235 kg/cm$^2$, an elongation of 46%, an oxygen permeability of 73 Barrers and an $n_D{}^{23}$ of 1.389 and was suitable for use as a contact lens.

EXAMPLE 14

A mixture of 7.0 g of a telechelic perfluoropolyether monomer having the structure

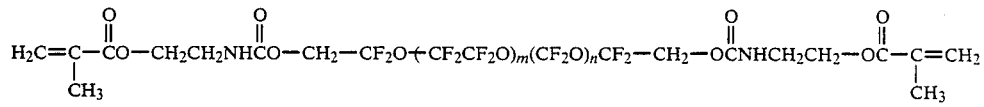

wherein m/n=about 0.7, m is about 15, n is about 21, and the formula weight of the perfluoropolyether is 4000, 3.0 g methyl methacrylate and 0.05 g 2,2-diethoxyacetophenone was polymerized by the procedure of Example 5. An optically clear film was obtained having an $n_D{}^{23}$ of 1.394, a tensile strength of 150 kg/cm$^2$, an elongation of 78%, a modulus of 3320 kg/cm$^2$ and an oxygen permeability of 95 Barrers.

EXAMPLE 15

A mixture of 4.8 g of the telechelic perfluoropolyether monomer of Example 1, 1.2 g methyl methacrylate,

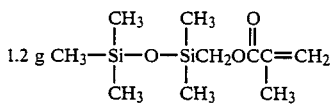

(Sylkem 21, trademark of Dow Corning) and 0.04 g α,α-diethoxyacetophenone was polymerized according to the procedure of Example 4. An optically clear sheet was obtained, the polymer of which had a tensile strength of 150 kg/cm$^2$, an elongation of 78% and an oxygen permeability of 96 Barrers, and $n_D{}^{23}$ of 1.404.

EXAMPLE 16

A mixture of 7.27 g of the telechelic perfluoropolyether monomer of Example 1, 2.19 g methyl methacrylate, 0.54 g hydroxyethyl methacrylate, and 0.05 g α,α-diethoxyacetophenone was prepared for polymerization via the freeze/thaw technique described in Example 2. The flask was transferred to a nitrogen filled glove bag and a portion of the contents were charged by means of a syringe into a contact lens mold.

The mold material was suitably transparent to ultraviolet radiation, thus the mixture was allowed to polymerize for one hour under low intensity ultraviolet irradiation. The resultant lens was transparent, flexible, bubble free and had an oxygen permeability of 48 Barrers, and an $n_D^{23}$ of 1.395.

EXAMPLE 17

The 70/30 copolymer film of Example 5 was evaluated for adsorption of tear protein as follows. A simulated tear solution was prepared which contained the folowing components for each liter of aqueous solution:
  8.4 g: sodium chloride
  0.08 g: calcium chloride
  1.38 g: sodium phosphate (pH 7.4)
  0.075 g: glutamic acid
  1.7 g: lysozyme
  3.9 g: albumin
  1.05 g: gamma globulin Radioactive proteins were prepared by mixing 5 mg of each protein with 100 μCi of $^3$H-N-succinimidyl propionate and storage of the reaction mixture at 0° C. for one hour. N-succinimidyl propionate that was not covalently attached to the protein was separated from the protein by gel permeation chromatography.

Three tear solutions were prepared. Each solution had only one protein component which was radioactive; the other two protein components were not radioactive.

Samples of polyhydroxyethyl methacrylate (pHEMA) sheets and the 70/30 copolymer were cut into 0.4 cm$^2$ pieces and equilibrated in saline (8.3 g sodium chloride/1.0 liter water).

The polymer samples were individually placed in separate vials, each containing 0.4 ml of the tear solution. A 20 μl aliquot of lipid mixture was layered on top of the aqueous layer. The composition of the lipid mixture was as follows:
  Butyl stearate: 0.23 μg
  Cholesteryl oleate: 0.16 μg
  Cholesteryl palmitate: 0.16 μg
  Tripalmitin: 0.04 μg
  Cetyl alcohol: 0.03 μg
  Oleic acid: 0.1 μg
  Lecithin: 0.16 μg The vials were placed in a shaker apparatus in a water bath which was maintained at 37° C. Polymer samples were soaked for one day. At the end of the time period, the polymer samples were removed from the sample vials and rinsed with saline. The polymer material was placed in a scintillation vial and counted for tritium content. Using this procedure, the amount of protein deposited on the polymer material was determined to be as follows:

TABLE II

| Protein | μg Protein/cm$^2$ Polymer | |
|---|---|---|
| | 70/30 Copolymer | pHEMA |
| Albumin | 0.90 | 3.5 |
| Gamma globulins | 0.30 | 2.5 |
| Lysozyme | 0.48 | 3.0 |

These data show that the amount of protein adsorbed to the 70/30 copolymer is much less than the amount of protein which adsorbed to HEMA.

EXAMPLE 18

A mixture of 7.27 g of the telechelic perfluoropolyether monomer of Example 1, 2.19 g methyl methacrylate, 0.54 g 2-hydroxyethyl methacrylate, and 0.05 g 2-hydroxy-2-methyl-b 1-phenyl-1-propane was prepared for polymerization by the freeze/thaw technique of Example 2. The composition was then polymerized to a film as described in Example 5. Its tensile strength was 140 kg/cm$^2$, elongation 41%, modulus of elasticity 4015 kg/cm$^2$, and $n_D^{25}$ 1.410. The film was optically clear and had a water contact angle of 47° and an oxygen permeability of 45 Barrers.

EXAMPLE 19

A mixture of 4.8 g of a telechelic perfluoropolyether monomer having the formula,

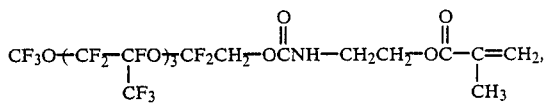

and 0.03 g α,α-diethoxyacetophenone was polymerized according to the procedure described in Example 5. The resulting clear transparent film obtained had an oxygen permeability of 117 Barrers, $n_D^{25}$ 1.365, tensile strength of 23.5 kg/cm$^2$, and an elongation of 65% and was suitable for optical purposes.

The telechelic perfluoropolyether monomer was prepared by the reaction of 2-isocyanatoethyl methacrylate with

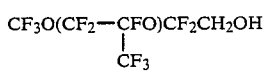

as described in Example 1. The clear oil isolated had $n_D^{23}$ 1.3449. Its identity was established by NMR.

EXAMPLE 20

A mixture was prepared to contain (a) 6.0 g telechelic perfluoropolyether monomer having the formula,

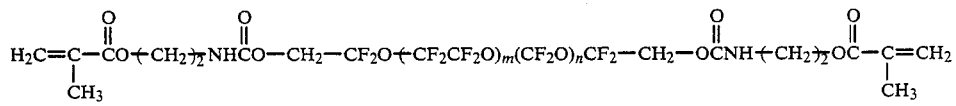

in which m/n is 0.6 and m is 8.3 and n is 13.9, (b) 3.0 g monomer having the formula

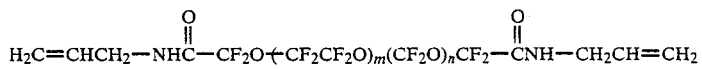

in which m/n is 0.6, m is 8.3 and n is 13.9, (c) 3.0 g of methyl methacrylate, and (d) 0.25 g α,α-diethoxyacetophenone.

The mixture was polymerized in accord with the procedure described in Example 4. An optically clear film was obtained which had a tensile strength of 135 kg/cm² and an oxygen permeability of 63 Barrers.

The first of the above telechelic perfluoropolyether monomers was prepared by the procedure described in Example 1 by the reaction of a hydroxyl-terminated perfluoropolyether of the formula shown in which m=8.3 with 2-isocyanatoethyl methacrylate. The second of the two telechelic perfluoropolyehter monomers was prepared by the reaction in accordance with the procedure described in Example 1 of U.S. Pat. No. 3,810,874 by the reaction of allylamine with the methyl ether of the perfluoropolyether dicarboxylic acid having the formula

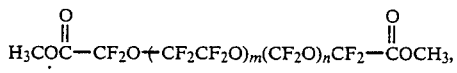

the prepartion of which is also taught in U.S. Pat. No. 3,810,874. The diallyl amide obtained had the formula

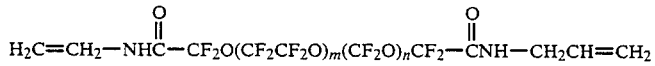

in which m/n is 0.6, m is 8.3 and n is 13.9.

EXAMPLE 21

A mixture of 25 g of telechelic perfluoropolyether monomer having the formula

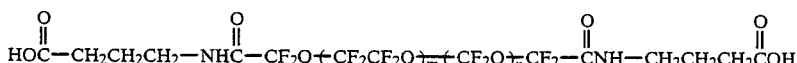

(having an equivalent weight of 1200 and prepared according to the procedure of Example XXVII of U.S. Pat. No. 3,810,874) and 2.5 g of an epoxy novolak resin (DEN-438, Dow Chemical Company) was stirred at 100° until a clear liquid resulted. The liquid was transferred to a Teflon ® sheet mold and degassed at 100°/1 mm for 2 hours. It was then heated at 110° for 48 hours. The resulting optically clear polymer film had a tensile strength of 18.3 kg/cm² and an elongation at break of 110%.

Hereinafter, the segment of perfluoropolyether monomer, —CF₂O—(CF₂CF₂O)ₘ—(CF₂O)ₙCF₂—, is abbreviated "PPE".

EXAMPLE 22

A mixture of 9.9 g of PPE—CONH—C₆H₃(CH₃)-NCO)₂ (prepared according to Example III of U.S. Pat. No. 3,810,874) and 0.1 g of a trimerization catalyst (prepared by heating a mixture of trihexylene glycol borate (7 g) and the sodium salt of 2,6-di-t-butyl-p-cresol (2 g) for 15 minutes at 120°) was poured into a mold and heated at 100° for 16 hours. The resulting optically clear polymer had a tensile strength of 24.6 kg/cm² and an elongation of 180%, and was suitable for optical purposes.

EXAMPLE 23

A mixture of 24 g of PPE—(CH₂O₂CC₆H₄NH₂)₂ (prepared according to Example XI of U.S. Pat. No. 3,810,874), 0.4 g cyclohexane triisocyanate, and 1.6 g of hexamethylene diisocyanate was stirred in a beaker at room temperature until homogeneous. The mixture was then transferred to a mold and heated at 80° for 3 days. The resulting optically clear, flexible polymer film had the following properties:

Tensile: 82.2 kg/cm²
Elongation: 280%
Shore A-2 hardness: 70
Oxygen permeability: 190 Barrers

EXAMPLE 24

A mixture of 4.8 g of 2000 MW PPE—(CH₂OH)₂ (prepared according to the procedure of Example VIII of U.S. Pat. No. 3,810,874) and 0.8 g of tetrafluorophenylene diisocyanate was stirred for two hours at 80°, transferred to a mold and heated for 16 hours at 80° followed by 24 hours at 125°. The resulting optically clear, flexible polymer had a tensile strength of 68.2 kg/cm² and an elongation of 850% and was suitable for use as a flexible contact lens.

EXAMPLE 25

A liquid mixture of 5.0 g of 2000 MW

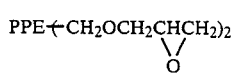

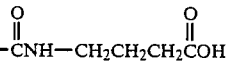

(prepared according to Example X of U.S. Pat. No. 3,810,874) and 0.10 g (CH₃SO₂)₂CHCH₂CBr-(CO₂CH₂CH₃)₂ catalyst was placed in a mold and heated at 90° for 30 minutes. The resultant transparent polymer was suitable for use as a flexible contact lens and had an oxygen permeability of 221 Barrers.

EXAMPLE 26

A sample of 2000 MW PPE—(CH₂OC₆H₄OCN)₂ (prepared according to Example XXI of U.S. Pat. No. 3,810,874) was placed in a mold and heated for 90 minutes at 150° followed by heating at 200° for 135 minutes. The resulting optically clear film had a tensile strength of 42.3 kg/cm2 and an elongation of 150%.

EXAMPLE 27

PPE—(CH₂NH₂)₂ having an equivalent weight of 1140 (prepared according to Example XVIII of U.S. Pat. No. 4,085,137) was polymerized to a polyimide by reaction with a mixture of the dianhydride of dicyclo-(2,2,2)-octane-(7)-2,3,5,6-tetracarboxylic acid and 4,4'-methylene diphthalic anhydride in accordance with the procedure disclosed at column 8 of U.S. Pat. No. 4,080,319. A flexible, thermoplastic, transparent polyimide that was readily molded was obtained.

EXAMPLE 28

The following exemplifies increasing the molecular weight of the telechelic perfluoropolyether monomer through chain extension. A mixture of 108.0 g of PPE(-$CO_2CH_3$)$_2$ (Formula IX, U.S. Pat. No. 4,094,911) having a molecular weight of 2160 (0.05 moles) and 1.85 g of 1,3-diaminopropane (0.025 moles) was mechanically shaken until the pH of the mixture no longer indicated the presence of unreacted diamine (15-20 min.). Then 3.05 g of ethanol amine (0.0500 moles) were added. After shaking for several hours, the pH of the mixture no longer indicated the presence of ethanol amine. The acrylate of this ethanol amine end-capped, chain extended telechelic perfluoropolyether monomer was then prepared as in Example XIX of U.S. Pat. No. 4,094,911 using 20.00 g of the chain extended monomer, 1.01 g of acryloyl chloride, and 2.24 g of triethylamine. A mixture of 4.00 parts of this chain extended monomer, 0.49 g methyl methacrylate, 0.36 g N-vinylpyrrolidone, and 0.0200 g 2-hydroxy-2-methyl-1-phenylpropan-1-one was then polymerized as in Example 2 irradiating with a RS sunlamp for 30 min. The resulting polymer had the following properties and was suitable for preparation of a contact lense: tensile, 105 kg/cm$^2$; modulus, 1680 kg/cm$^2$; 28% elongation; and oxygen permeability of 108 Barrers.

We claim:

1. A contact lens comprising a polymer of a telechelic perfluoropolyether monomer having a number average molecular weight between about 500 and 15,000 which has the formula $$Q-W-(C_kF_{2k}O)_p-(C_qF_{2q})-Z$$

wherein Q is a functional group which will undergo electrophilic, nucleophilic, or free radical reaction; W is a divalent connecting moiety; Z is —WQ or fluorine; p represents the nunber of —$C_kF_{2k}O$— subunits in said monomer and is an integer of from 3 to 200; q is an integer of from 1 to 4; and k is the same within a given —$C_kF_{2k}O$— subunit but may vary from —$C_kF_{2k}O$— subunit to —$C_kF_{2k}O$— subunit and is an integer of from 1 to 4.

2. A contact lens according to claim 1 wherein said perfluoropolyether monomer has the formula $$Q-W-CF_2O-(CF_2CF_2O)_m-(CF_2O)_n-CF_2-Z$$

wherein m and n are numbers providing said number average molecular weight and independently have a value of from 1 to 120; the sum of m and n is from 7 to 120; and the ratio of m/n is from 0.2/1 to 5/1.

3. A contact lens according to claim 1 wherein said Q group has a group functionality in the range of 1.5 to 2.

4. A contact lens according to claim 1 wherein said reactive group has a group functionality of 2.

5. A contact lens according to claim 1 which contains less than 10% by weight of water.

6. An oxygen permeable contact lens according to claim 1.

7. A contact lens according to claim 6 which is resistant to absorption of tear components.

8. A flexible, mechanically strong contact lens according to claim 6.

9. A contact lens according to claim 6 having an oxygen permeability of at least 10 Barrers.

10. A contact lens comprising an oxygen permeable copolymer of (a) a telechelic perfluoropolyether monomer having a number average molecular weight between about 500 and 15,000 which has the formula $$Q-W-(C_kF_{2k}O)_p-(C_qF_{2q})-Z$$

wherein Q is a functional group which will undergo electrophilic, nucleophilic, or free radical reaction; W is a divalent connecting moiety; Z is —WQ or fluorine; p represents the number of —$C_kF_{2k}O$— subunits in said monomer and is an integer of from 3 to 200; q is an integer of from 1 to 4; and k is the same within a given —$C_kF_{2k}O$— subunit but may vary from —$C_kF_{2k}O$— subunit to —$C_kF_{2k}O$— subunit and is an integer of from 1 to 4, and (b) a compatible, first comonomer copolymerizable with said telechelic perfluoropolyether monomer.

11. A contact lens according to claim 10 comprising from 98 to 50 weight percent of said telechelic perfluoropolyether monomer and correspondingly from 2 to 50 weight percent of said first comonomer.

12. A contact lens according to claim 10 wherein said oxygen permeable copolymer is a copolymer of (a) said telechelic perfluoropolyether monomer, (b) said first comonomer, and (c) a second copolymerizable comonomer containing a hydrophilic group.

13. A contact lens according to claim 1 wherein Q is an ethylenically unsaturated group, and said first comonomer is an ethylenically unsaturated comonomer.

14. A contact lens according to claim 12 comprising from 50 to 88 weight percent said telechelic perfluoropolyether, from 10 to 48 weight percent said ethylenically unsaturated first comonomer, and from 2 to 10 weight percent said second copolymerizable comonomer.

15. A contact lens according to claim 13 wherein said ethylenically unsaturated first comonomer is selected from methyl or ethyl acrylate, methyl or ethyl methacrylate, cyclohexyl methacrylate, methyl 2-chloroacrylate, 2-ethoxyethyl methacrylate, 2,2,2-trifluoroethyl acrylate or methacrylate, 2-cyanoethyl methacrylate, 2-(N-methylcarbamoyloxy)ethyl acrylate or methacrylate, acrylic acid, methacrylic acid, vinylidene chloride, vinylidene fluoride, methacryloyloxypropyl-tris(trimethylsilyl)siloxane, methacryloyloxymethylpentamethyldisiloxane, and mixtures thereof.

16. A contact lens according to claim 15 wherein said ethylenically unsaturated first comonomer is selected from methyl methacrylate, ethyl methacrylate, or cyclohexyl methacrylate.

17. A contact lens according to claim 16 wherein said ethylenically unsaturated first comonomer is methyl methacrylate.

18. A contact lens according to claim 13 wherein said second copolymerizable comonomer is an ethylenically unsaturated monomer and said hydrophilic group is selected from the group consisting of hydroxy groups, carboxy groups, carbonamide groups, sulfonyl groups, and sulfonamide groups.

19. A contact lens according to claim 18 wherein said second copolymerizable comonomer is selected from the group consisting of 2-hydroxyethyl acrylate or methacrylate, 3-hydroxypropyl acrylate, 4-hydroxybutyl acrylate, 5-hydroxypentyl acrylate, 2,3-dihydroxypropyl acrylate or methacrylate, N-vinyl-2-pyrrolidone, 2-carboxyethyl acrylate, 2-carbonamidoethyl methacrylate, 2-sulfoethyl methacrylate, 2-sulfoamidoethyl acrylate, vinylsulfonic acid, and mixtures thereof.

20. A contact lens according to claim 18 wherein said second copolymerizable comonomer is selected from 2-hydroxyethyl acrylate and methacrylate, 2,3-dihydroxypropyl acrylate and methacrylate, N-vinyl-2-pyrrolidone, and mixtures thereof.

21. A contact lens according to claim 20 wherein said second copolymerizable comonomer is N-vinyl-2-pyrrolidone.

22. A contact lens according to claim 20 wherein said second copolymerizable comonomer is 2-hydroxyethyl methacrylate.

23. A contact lens according to claim 18 wherein said perfluoropolyether monomer, said ethylenically unsaturated first comonomer, and said second copolymerizable comonomer are further polymerized with a third comonomer selected from the group consisting of ethylene glycol diacrylate, ethyleneglycol dimethacrylate, diethyleneglycol dimethacrylate, allyl methacrylate, trimethylolpropane trimethacrylate, divinyl benzene, diallyl phthalate, tris(2-acryloyloxyethyl)isocyanurate, and 1,3,5-tri(2-methacryloxyethyl)isocyanurate.

24. A contact lens according to claim 23 wherein Q is selected from the group consisting of vinyl, epoxide, isocyanate, carboxyl, hydroxyl, amino, sulfhydryl, sulfalkyl, silyl, cyano, sulfoalkyl, carbonyloxy, oxycyano, cyanamide, iodo, carbonyl, alkyl ether, sulfonyl chloride, and imino groups.

25. A contact lens according to claim 24 wherein Q is selected from the group consisting of

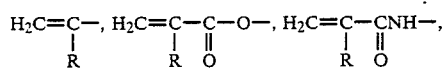

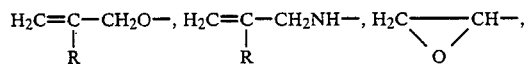

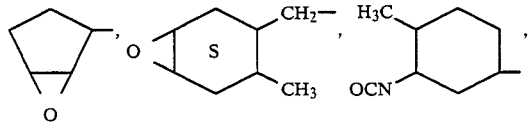

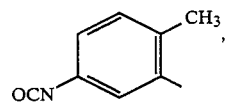

—NCO, —COOH, —OH, —NH$_2$, —SR, —SiR$_g$R$^1$, —CN, —OSO$_2$CF$_3$, —OCOCl, —OCN, —N(R)CN, —I, —CHO, —CH(OR)$_2$, —SO$_2$Cl, —C(OR)=NH, and —C(NH$_2$)=NH wherein R is selected from hydrogen and lower alkyl containing from one to four carbon atoms, R$^1$ is selected from halogen, —OR,

and —CH=CH$_2$, and g is 0, 1, 2 or 3.

26. A contact lens according to claim 25 wherein Q is selected from the group consisting of

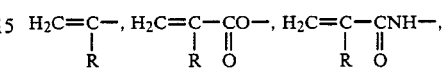

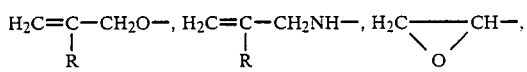

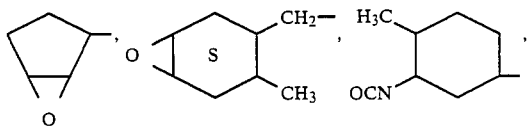

—NCO, —COOH, —OH, and —NH$_2$ wherein R is hydrogen or methyl.

27. A contact lens according to claim 26 wherein said end group is selected from

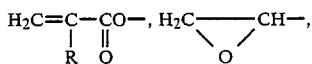

and —NCO.

28. A contact lens according to claim 27 wherein R is hydrogen.

29. A contact lens according to claim 27 wherein R is methyl.

UNITED STATES PATENT AND TRADEMARK OFFICE
CERTIFICATE OF CORRECTION

PATENT NO. : 4,818,801

DATED : April 4, 1989

INVENTOR(S) : DAVID E. RICE & JAY V. IHLENFELD

It is certified that error appears in the above-identified patent and that said Letters Patent is hereby corrected as shown below:

Col. 3, line 67, "-CH(OR$_2$)" should be -- -CH(OR)$_2$ --.

Col. 4, line 10, "Exaples" should be -- Examples --.

Col. 11-12, line 28, Formula No. XXVI is missing a double oxygen bond; Formula should read as follows:

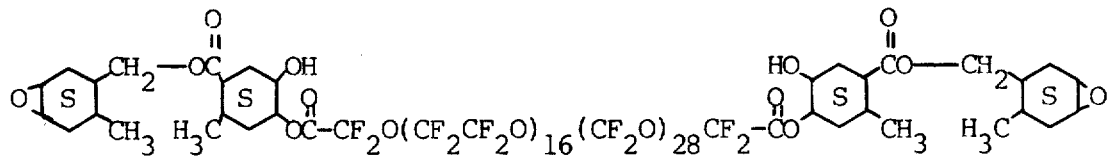

Col. 24, line 17 "methyl-b 1-phenyl" should be -- methyl-1-phenyl --.

Col. 25, line 55 "PPE-CONH" should be -- PPE(CONH --

Col. 26, line 41 after "0.01 g" insert "of".

Col. 26, line 41 "(CH$_3$SO$_2$)$_2$" should be --(CF$_3$SO$_2$)$_2$ --

Signed and Sealed this

Twenty-seventh Day of March, 1990

Attest:

JEFFREY M. SAMUELS

Attesting Officer   Acting Commissioner of Patents and Trademarks